556X
A. D. Allen,
Bench Plane.
Patented May 10. 1804.
Fig. 1.
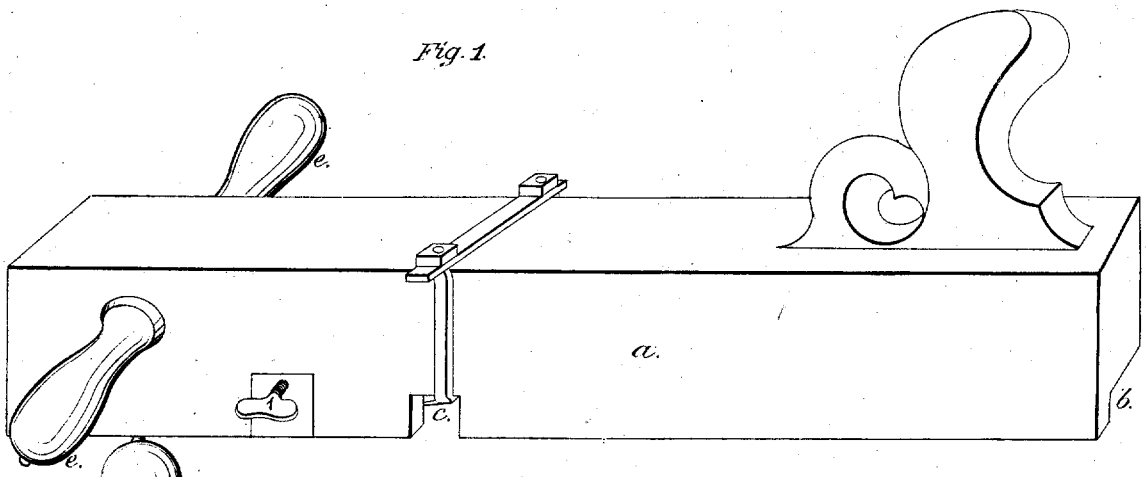
Fig. 2.
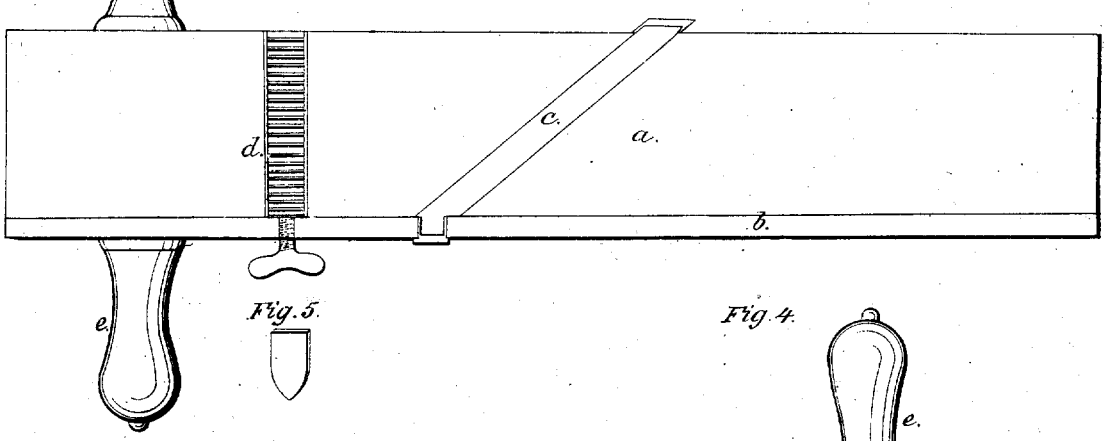
Fig. 5.
Fig. 4.
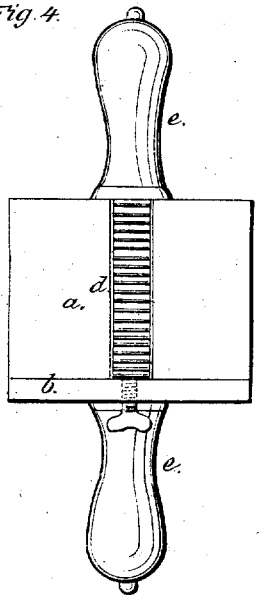
Fig. 3.
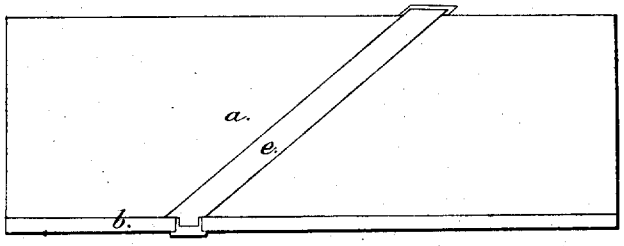
N. PETERS, PHOTO-LITHOGRAPHER, WASHINGTON, D. C.

[illegible] Amos D. Allen of the State of Connecticut May 10, 1804

Letters Patent May 11. 1804.

The Schedule referred to in these Letters Patent and making part of the same, containing a description in the words of the said Amos D. Allen himself of his Machine to cut strips or chips of wood to make chip Hats & Bonnets The Machine is made in the following manner Viz: A solid firm piece of wood, resembling a heavy jointer with a lip on the side next the workman, which prevents its varying sideways to injure the chip in width. Then about one third of the length from the foreend is inserted a wide cutting Iron set very sloping, about forty degrees. Then set in a piece of iron, brass or other substance twenty five or more cutting blades (as best suits the workman) about one inch long, resembling a lancet, set in a mortice after the manner of Types. The space between each cutting blade must be filled with wood or metal of suitable thickness to make the width of the chip. The blades must be fastened with a wedge or screw so as to be taken out for sharpening &c. When so set they are screwed in again about two or three inches forward of the cutting iron, so that the flat sides of the blades stand parallel with the side of the stock, & out in sight at the points about one eighth of an inch. Handles must be inserted ~~[illegible]~~ at the foreend in the sides, and at the top at the hind end. This machine is operated by two persons. In order to operate by one person, the small cutting blades must be set in a piece of wood about six inches wide, so as to have a shoulder to run against the side of the timber sufficient to steady it, and is used first and serves only to divide all the strips to an equal width. Then the above described machine without the cutting blades following takes it off to an exact thickness.

The wood should be first prepared by making it of an exact thickness. Green wood is preferable to dry and white poplar is the most commonly used.

Amos D. Allen

Witnesses – Alfred Elderkin / Zephaniah Swift ([illegible])

[illegible]